United States Patent
Tabet et al.

(10) Patent No.: US 10,581,583 B2
(45) Date of Patent: Mar. 3, 2020

(54) VOLTE CALL ESTABLISHMENT IN TD AND FDD LTE NETWORKS

(71) Applicant: Apple Inc., Cupertino, CA (US)

(72) Inventors: Tarik Tabet, San Jose, CA (US);
Farouk Belghoul, Cupertino, CA (US);
Rafael L. Rivera-Barreto, Cupertino, CA (US); Samy Khay-Ibbat, Cupertino, CA (US); Sree Ram Kodali, Cupertino, CA (US); Sarma V. Vangala, Cupertino, CA (US); Syed A. Mujtaba, Cupertino, CA (US);
Swaminathan Balakrishnan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 14/503,202

(22) Filed: Sep. 30, 2014

(65) Prior Publication Data
US 2015/0181483 A1    Jun. 25, 2015

Related U.S. Application Data

(60) Provisional application No. 61/919,987, filed on Dec. 23, 2013.

(51) Int. Cl.
| | |
|---|---|
| *H04L 5/14* | (2006.01) |
| *H04L 5/00* | (2006.01) |
| *H04W 36/00* | (2009.01) |
| *H04W 76/10* | (2018.01) |
| *H04W 48/18* | (2009.01) |
| *H04W 88/06* | (2009.01) |

(52) U.S. Cl.
CPC ............ *H04L 5/14* (2013.01); *H04W 36/0022* (2013.01); *H04W 48/18* (2013.01); *H04W 76/10* (2018.02); *H04L 5/001* (2013.01); *H04W 88/06* (2013.01)

(58) Field of Classification Search
CPC . H04W 88/06; H04W 72/1215; H04W 16/14; H04W 36/0022; H04W 36/14; H04W 36/30; H04W 48/18; H04W 76/02; H04L 5/14
See application file for complete search history.

(56) References Cited

U.S. PATENT DOCUMENTS

| | | | |
|---|---|---|---|
| 9,301,295 B1* | 3/2016 | Singh ............... | H04W 72/0426 |
| 2013/0343252 A1* | 12/2013 | Chakraborty ..... | H04W 52/0261 370/311 |

(Continued)

*Primary Examiner* — Ayaz R Sheikh
*Assistant Examiner* — Mariela Vidal Carpio
(74) *Attorney, Agent, or Firm* — Kowert, Hood, Munyon, Rankin & Goetzel, P.C.

(57) ABSTRACT

This application discloses various techniques for call establishment using voice-over LTE (VoLTE) in networks supporting time division (TD) and frequency division duplexed (FDD) LTE communication systems. Such techniques can include systems and methods for mobile-originated calls for a UE in a TD-LTE cell, systems and methods for mobile-terminated calls for a connected UE in a TD-LTE cell and systems and methods for mobile-terminated calls for an idle UE in a TD-LTE cell. These methods and systems can leverage component carriers from a carrier aggregating capable UE to facilitate more efficient and/or effective UE call establishment.

17 Claims, 8 Drawing Sheets

(56) References Cited

U.S. PATENT DOCUMENTS

| | | | | |
|---|---|---|---|---|
| 2014/0036710 A1* | 2/2014 | Chin | ............... | H04W 24/10 |
| | | | | 370/252 |
| 2014/0094188 A1* | 4/2014 | Kazmi | ............... | G01S 5/0242 |
| | | | | 455/456.1 |
| 2014/0113636 A1* | 4/2014 | Lee | ............... | H04W 36/00 |
| | | | | 455/437 |
| 2014/0269354 A1* | 9/2014 | Su | ............... | H04W 24/02 |
| | | | | 370/252 |
| 2015/0029883 A1* | 1/2015 | Takahashi | ............... | H04W 24/10 |
| | | | | 370/252 |
| 2015/0109918 A1* | 4/2015 | Sharma | ............... | H04L 5/14 |
| | | | | 370/230 |
| 2015/0109946 A1* | 4/2015 | Sharma | ............... | H04L 5/14 |
| | | | | 370/252 |
| 2015/0334639 A1* | 11/2015 | Kishiyama | ............... | H04W 24/10 |
| | | | | 455/434 |
| 2015/0341148 A1* | 11/2015 | Kazmi | ............... | H04L 5/0098 |
| | | | | 370/252 |
| 2016/0080094 A1* | 3/2016 | Kim | ............... | H04L 5/001 |
| | | | | 455/63.1 |

* cited by examiner

VOLTE CALL ESTABLISHMENT IN TD AND FDD LTE NETWORKS

PRIORITY

This application claims the benefit of priority from U.S. Provisional Application Ser. No. 61/919,987, entitled "Call Establishment Time Reduction and Redirection for VoLTE Calls in Networks Supporting TD and FDD LTE" and filed on Dec. 23, 2013, which is fully incorporated herein by reference for all purposes and to the extent not inconsistent with this application.

BACKGROUND

Field of the Application

This disclosure is directed to wireless communications and, more particularly, to call establishment for voice-over LTE (VoLTE) in networks supporting TD and FDD LTE.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Modern wireless communication systems use 3GPP Long-Term Evolution (LTE), which is optimized for data transfer and designed as a packet switched system only. LTE does not include any circuit switched domains, which are currently used for regular wireless voice services and wireless short messaging service (SMS) services. To implement voice capability in an LTE communication system, voice-over LTE (VoLTE) will be used and various network elements and protocols will need to be upgraded to effective support VoLTE.

Therefore what is needed are effective and efficient systems and software for implanting an operable VoLTE network.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, such as Code Division Multiple Access ("CDMA") systems, Multiple-Carrier CDMA ("MCCDMA"), Wideband CDMA ("W-CDMA"), High-Speed Packet Access ("HSPA," "HSPA+")

systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, CDMA2000, IS-856, W-CDMA, TDSCDMA, and other standards. A CDMA network may implement a radio technology such as Universal Terrestrial Radio Access ("UTRA)", CDMA2000, or some other technology. UTRA includes W-CDMA and Low Chip Rate ("LCR"). The CDMA2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(Wi-MAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (lxRTT, 1xEV-DO RelO, RevA, RevB) technology and other technologies, such as WiFi, WiMAX, WMBA and the like.

Figure 1:
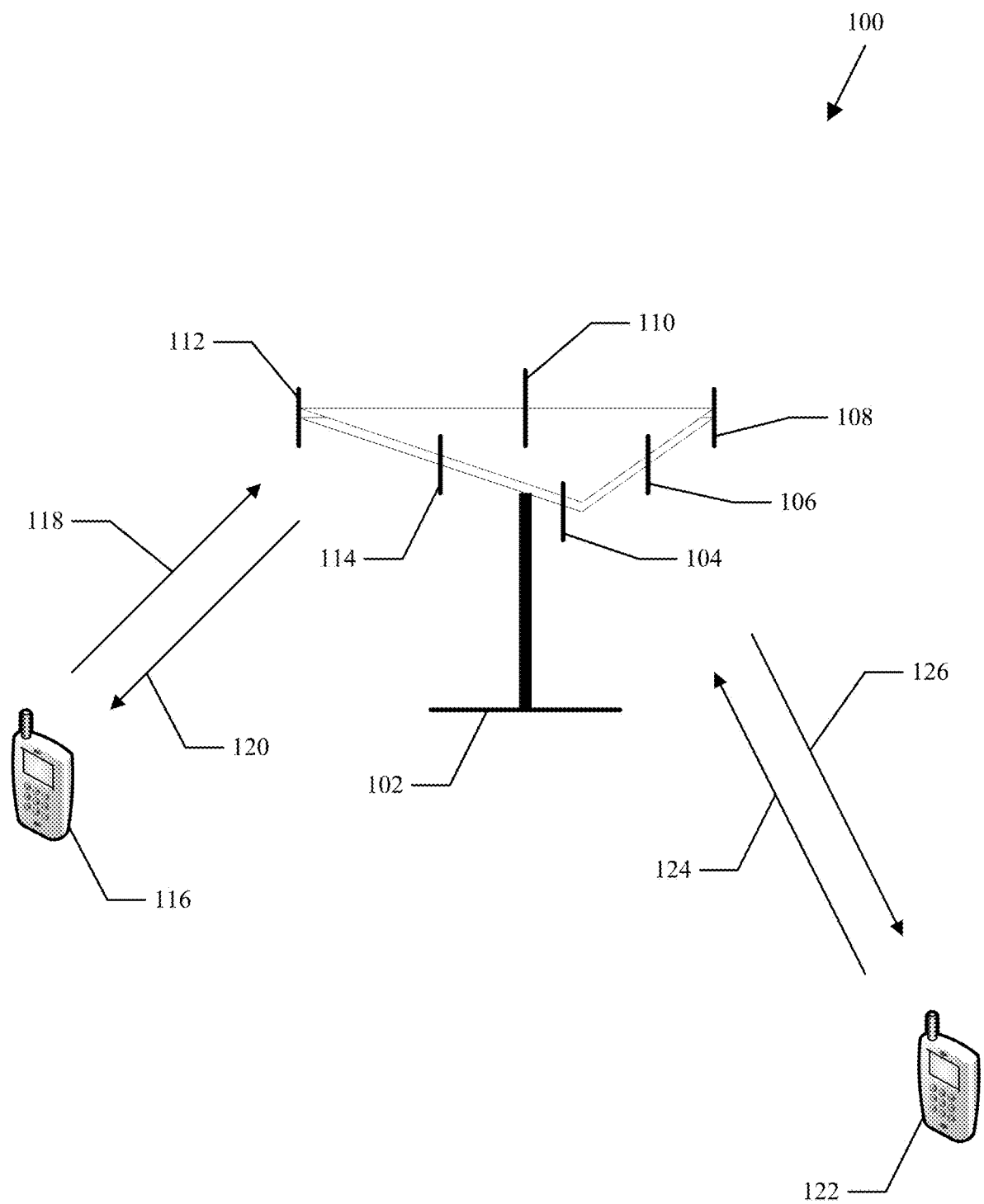
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an enhanced Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequencies for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
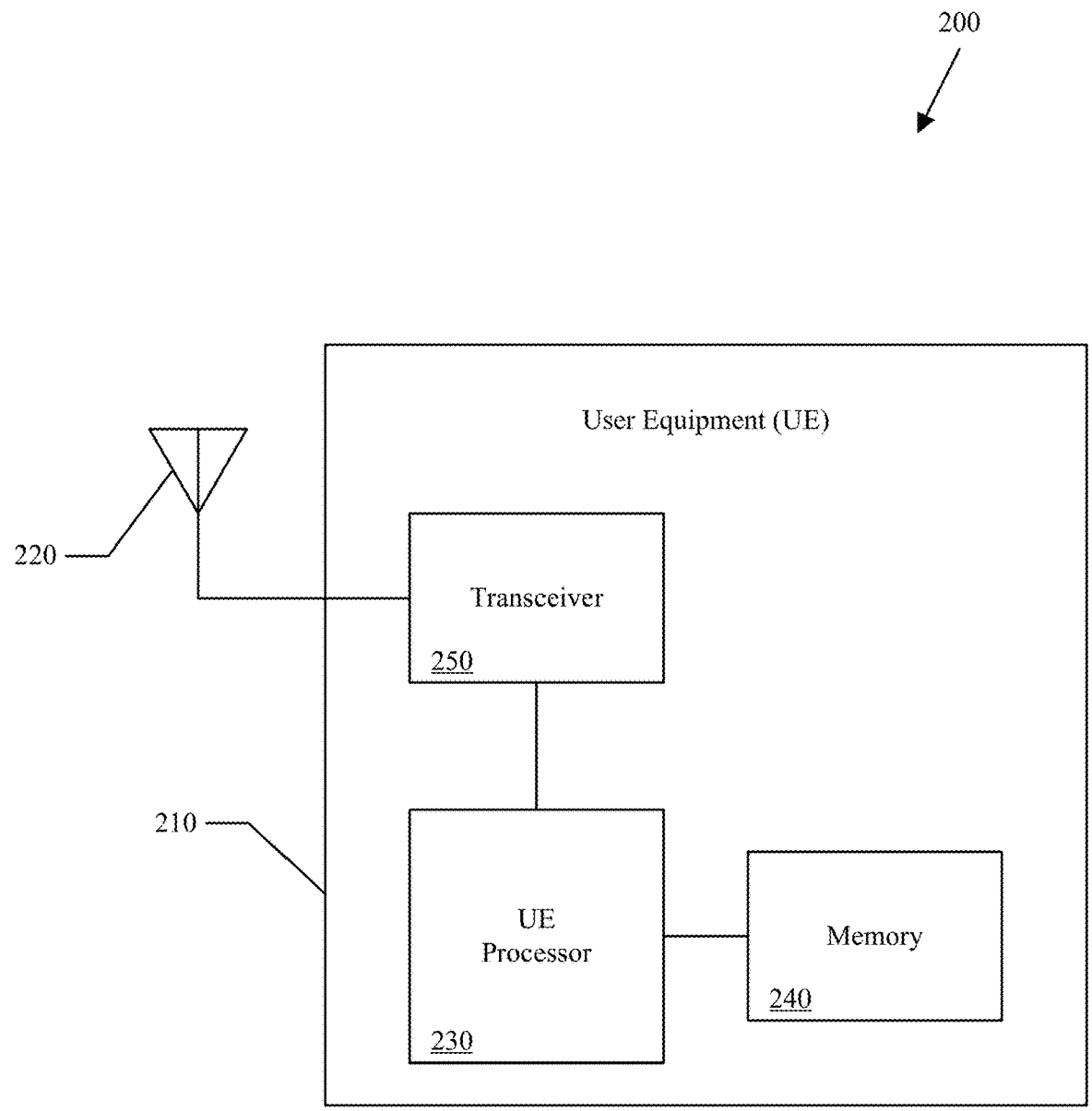
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 250, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 250 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
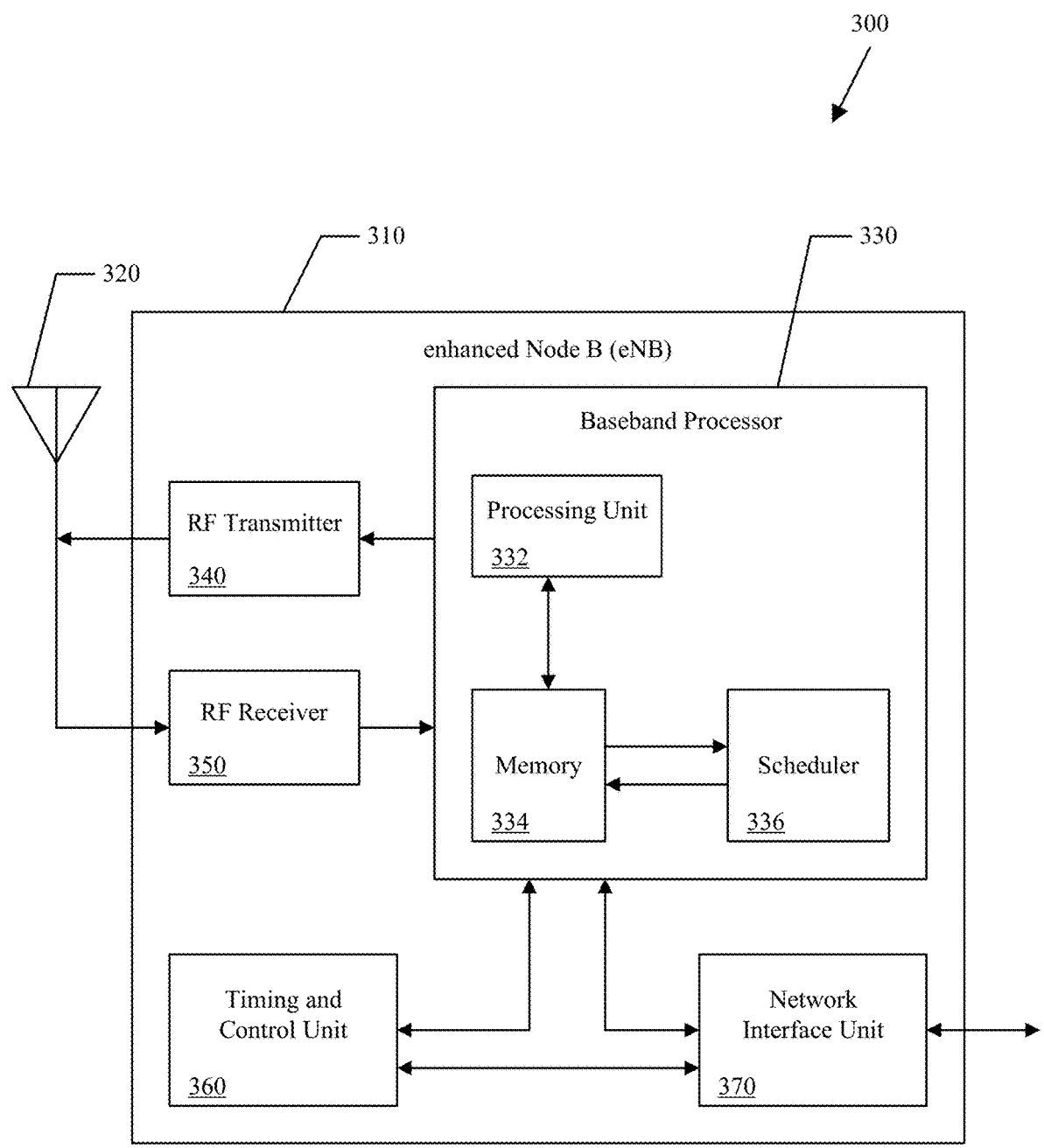
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to the eNB antenna 320. While only one antenna is shown, certain embodiments are applicable to multi-antenna configurations. RF transmitter 340 and RF receiver 350 may be combined into one, transceiver unit, or duplicated to facilitate multiple antenna connections. Baseband processor 330 may be configured (in hardware and/or software) to function according to a wireless communications standard, such as 3GPP LTE. Baseband processor 330 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e. g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Figure 4:
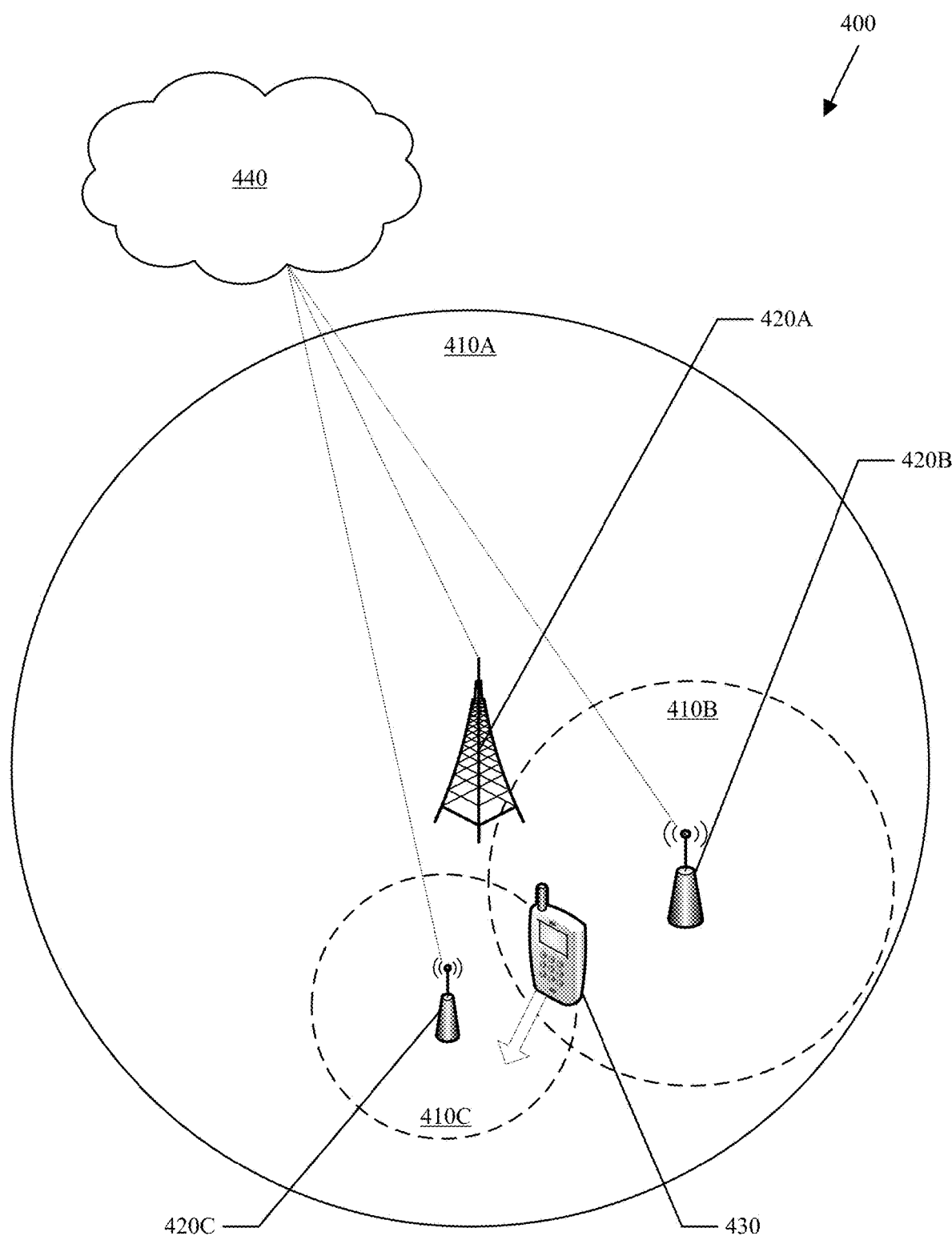
FIG. 4 illustrates an exemplary multi-RAT wireless network according to certain embodiments.

FIG. 4 illustrates an exemplary multi-RAT (radio access technology) wireless network 400 according to certain embodiments. As shown in FIG. 4, a mobile device (handset, UE, etc.) 430 is within the coverage area of multi-RAT wireless network 400. Multi-RAT wireless network 400 can include multiple network coverage pieces. For example, the once coverage area can be a cell 410A, such as in an LTE coverage area or TD-LTE coverage area. Within (or partially within) cell 410A coverage area, there can concurrently exist one or more other coverage areas, or cells 410B and 410C, such as in an FDD-LTE, GSM, WiMAX, CDMA or even WiFi coverage area. As shown, cells 410B, 410C are within cell 410A and at least partially overlap each other, although this configuration is for illustrative purposes only. Each cell 410 can also include some sort of network access device 420A, 420B and 420C, such as a base station, eNodeB or access point. Each network access device 420 can communicate with one or more mobile devices 430, as well as with a core network 440. Not shown are possible intermediate network components or system elements that may be between each network access device 420 and core network 440. In certain embodiments, mobile device 430 can be moving within cell 410A and moving out of cell 410B and into cell 410C. In this way, mobile device 430 could possibly communicate with one or more of cells 410A, 410B and 410C.

Modern wireless communication systems use 3GPP Long-Term Evolution (LTE), which is optimized for data transfer and designed as a packet switched system only. LTE does not include any circuit switched domains, which are currently used for regular wireless voice services and wireless short messaging service (SMS) services. To implement voice capability in an LTE communication system, voice-over LTE (VoLTE) will be used.

In certain embodiments, to run over an LTE network using VoLTE, an IMS (IP Multimedia System) core network can be upgraded to provide the telephony service over IP (i.e., Internet protocol, or packet-switching). An MMTel (Multi Media Telephony, deployed on the IMS core) can be upgraded to provide the telephony and other services (e.g., presence, video calling, chat, and so on) in both LTE and fixed networks. The LTE radio access network and the Evolved Packet Core (EPC) can be upgraded to support VoLTE, which can be achieved by software upgrades.

By definition, the VoLTE profile specifies IMS-based voice services over LTE. However, the architecture used for VoLTE can be used to deliver high-quality communication services over any packet switched access capable of securing the necessary quality of service (QoS). VoLTE specifications are modular and the upper layers of IMS control and applications are fully reusable for other packet-switched access types and the same service definition can be used for those other packet-switched access types.

For example, consumers may be able to use operator-provided HD voice, video calling and other communication services (chat, presence, and more) on VoLTE smartphones and other devices. These services can use a regular mobile phone number (MSISDN, Mobile Subscriber Integrated Services Digital Network-Number), and VoLTE brings the operator telephony values into an all-IP mobile broadband network: global interoperability, Quality of Service, roaming and seamless mobility, between any mobile devices, over any access. With VoLTE, both voice and LTE data services can be used simultaneously on LTE smartphones.

Due to regulations and deployments scenarios of some countries, VoLTE may not be supported in TD-LTE cells. For example, a UE camped or connected to a TD-LTE cell will use circuit-switched (CS) services for voice calls (i.e., either through CS fallback (CSFB) or internal dual radio connections). This can negatively impact the quality of the voice calls and can also have a negative impact on the UE implementation and UE battery. For example, the CSFB procedure might introduce a delay depending on the TD-LTE network (NW) implementation. Also, a dual radio UE receiver has a negative impact on the battery consumption of the UE and the possibly the physical characteristics of the UE. Hence, certain embodiments of this disclosure introduce a mechanism to alleviate some or all of the potential negative impact of such regulation and/or deployment scenarios on the UE performance and user experience.

Figure 5:
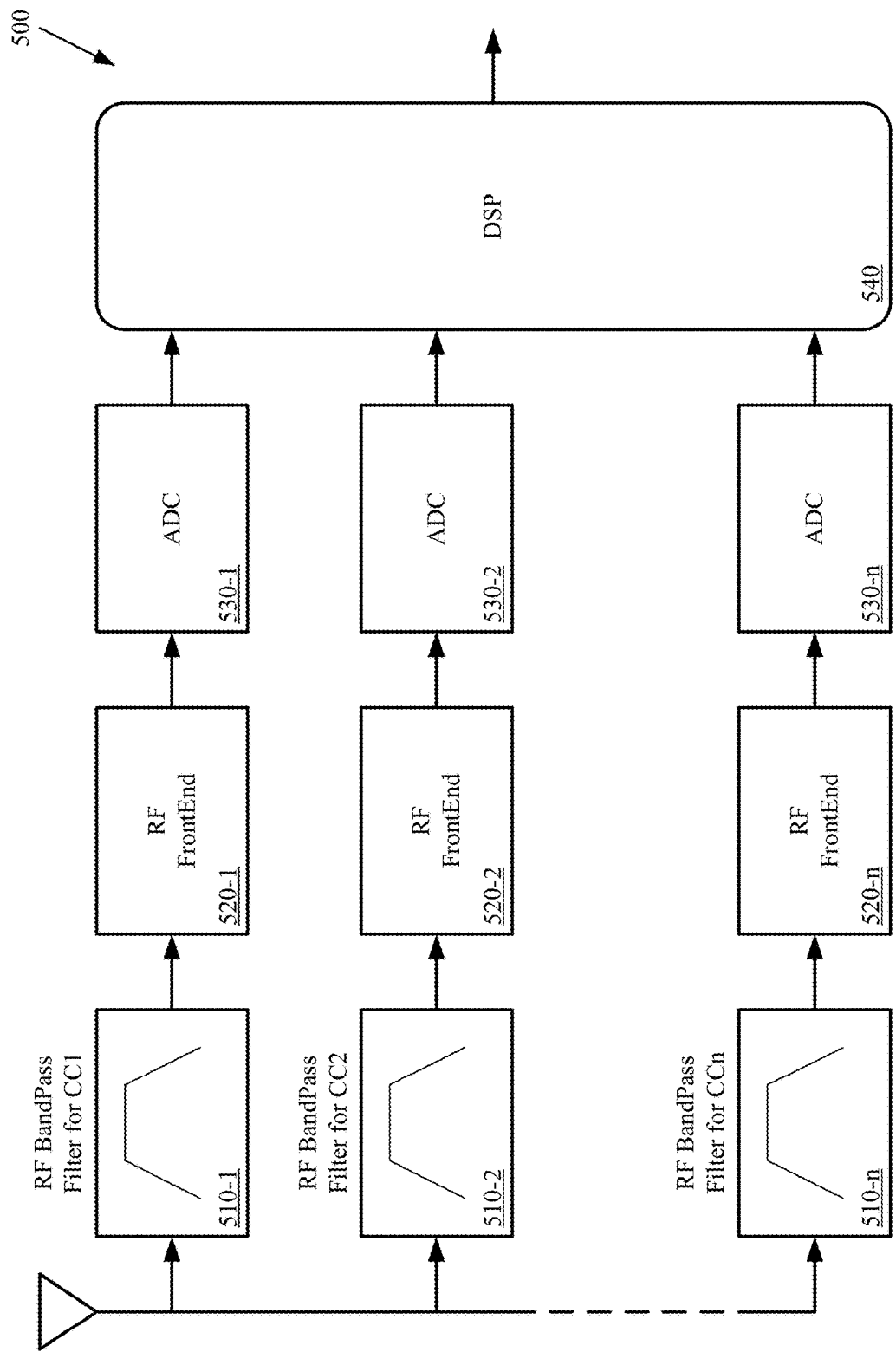
FIG. 5 illustrates an exemplary transceiver architecture implementing multiple carrier components according to certain embodiments.

In LTE Rel10, the transmission bandwidth can be extended through aggregation of multiple component carrier (CC) chains that can be used to/from a single UE. This feature is commonly known as carrier aggregation (CA). In carrier aggregation, each CC (i.e., by itself) is backward compatible to the LTE Rel-8 carrier structure. Carrier aggregation supports both contiguous and non-contiguous spectrums. FIG. 5 illustrates an exemplary transceiver architecture 500 implementing multiple component carriers according to certain embodiments. As shown in FIG. 5, three (3) of n CCs are illustrated as part of transceiver architecture 500. In each of the three CCs, there is a bandpass filter 510-$x$ coupled to a radio frequency (RF) frontend 520-$x$ coupled to an analog to digital converter (ADC) 530-$x$. There may be additional components in each CC, which for simplicity of understanding are not shown here. Each ADC 530-$x$ can finally be coupled to at least one digital signal processor (DSP) 540.

Figure 6:
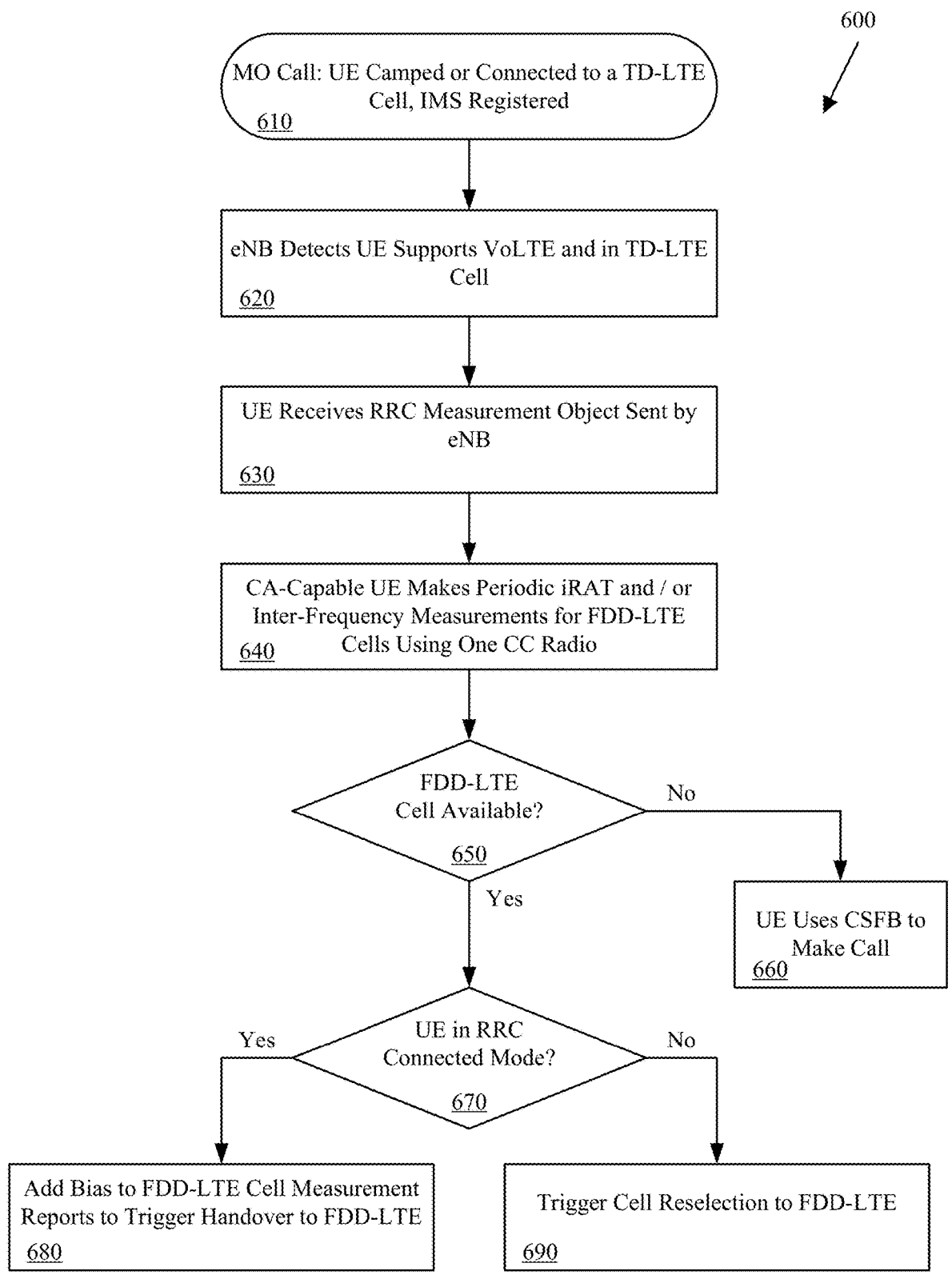
FIG. 6 illustrates an exemplary UE solution flowchart for mobile originated (MO) calls according to certain embodiments.

FIG. 6 illustrates an exemplary UE solution flowchart 600 for mobile originated (MO) calls according to certain embodiments. As shown in FIG. 6, at 610, a carrier aggregation (CA) capable UE is camped (e.g., RRC idle mode) or connected (e.g., RRC connected mode) to a TD-LTE cell and registered to an IP multimedia service (IMS). In this case, the UE will not be configured in carrier aggregation (CA), since there are no CA network deployments in TD-LTE. At 620, the eNB, by detecting that the UE supports VoLTE in the RRC messages and that the UE is connected to an TD-LTE cell, will send an RRC measurement object, containing a list of inter-frequency bands the UE would measure. At 630, the UE receives the eNB-sent RRC measurement object. The list will contain, among other items, the FDD frequencies the UE can use for VoLTE calls. Typically, UE inter-frequency measurements are periodic, since the eNB will allocate, for example, a gap measurement of 6 ms every 40 ms.

At 640, since the UE also supports carrier aggregation (CA), as in LTE Rel10, the UE can periodically dedicate fewer than all component carriers (e.g., one (1) carrier component (CC) out of perhaps three (3) CCs) to make inter-RAT (iRAT) and/or inter-frequency measurements, for example, specifically for an FDD-LTE cell. The periodicity of such measurements could follow the inter-frequency measurements periodicity or could be optimized depending on the UE implementation. This could be easily enabled in current networks, since there are no CA deployments for TD-LTE).

The UE, while making neighbor measurements, can read the system information block (SIB) information to recognize the nature of the cell (FDD or TD) and also the tracking area (TA) information. The UE can keep a list of all neighbor FDD-LTE cells, which might be used for VoLTE calls. As 650, if the UE cannot find an FDD-LTE cell, then at 660 the UE can establish a mobile-originate call using a CSFB procedure. As 650, if the UE can find an FDD-LTE cell, then prior to making a VoLTE call (e.g., via a session initiation protocol (SIP) invite), at 670 the UE can: 1) if in RRC connected mode at 680, add a bias to its FDD-LTE cell measurement reports in order to trigger an inter-frequency handover (HO) to an FDD-LTE cell, or 2) if in RRC idle mode at 690, trigger a cell reselection to an FDD-LTE cell.

Figure 7:
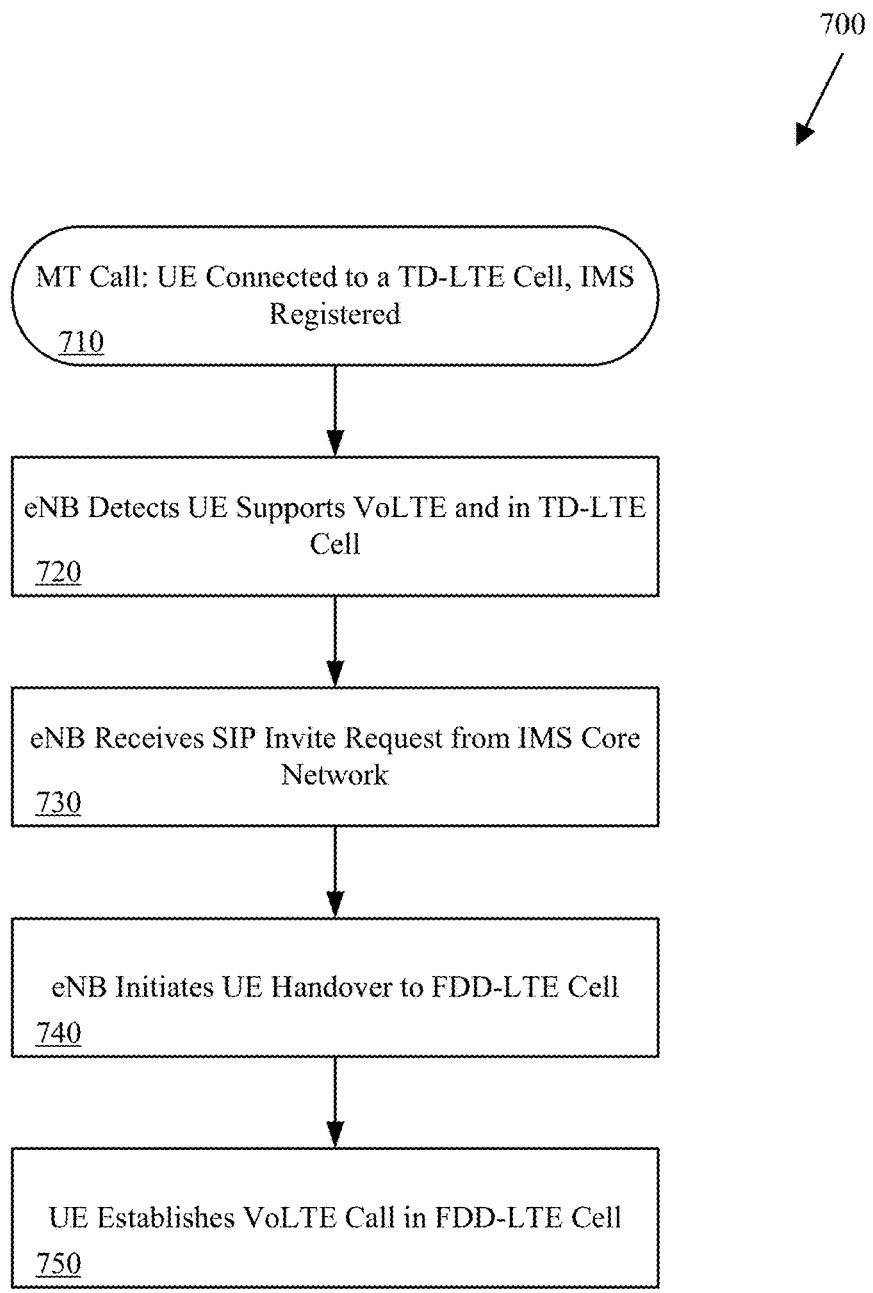
FIG. 7 illustrates an exemplary UE solution flowchart for UE-connected, mobile terminated (MT) calls according to certain embodiments.

FIG. 7 illustrates an exemplary UE solution flowchart 700 for UE-connected, mobile terminated (MT) calls according to certain embodiments. As shown in FIG. 7, at 710, the UE is connected to a TD-LTE cell and is IMS registered. At 720, the eNB detects that the UE supports VoLTE and is in the TD-LTE cell. In RRC connected mode, at 730, the IMS core network detects an incoming session initiation protocol (SIP) invite and generates a request to the eNB. At 740, the eNB detects that the UE is under TD-LTE coverage and initiates a handover command (HO) procedure by sending a HO to the UE to switch to an FDD-LTE cell. This procedure can involve some or all of the core network components (e.g., the IMS/NAS/AS components). At 750, the UE can then establish the VoLTE call in an FDD-LTE cell. A similar procedure can be used for a call generated from a landline or CS-based phone.

Figure 8:
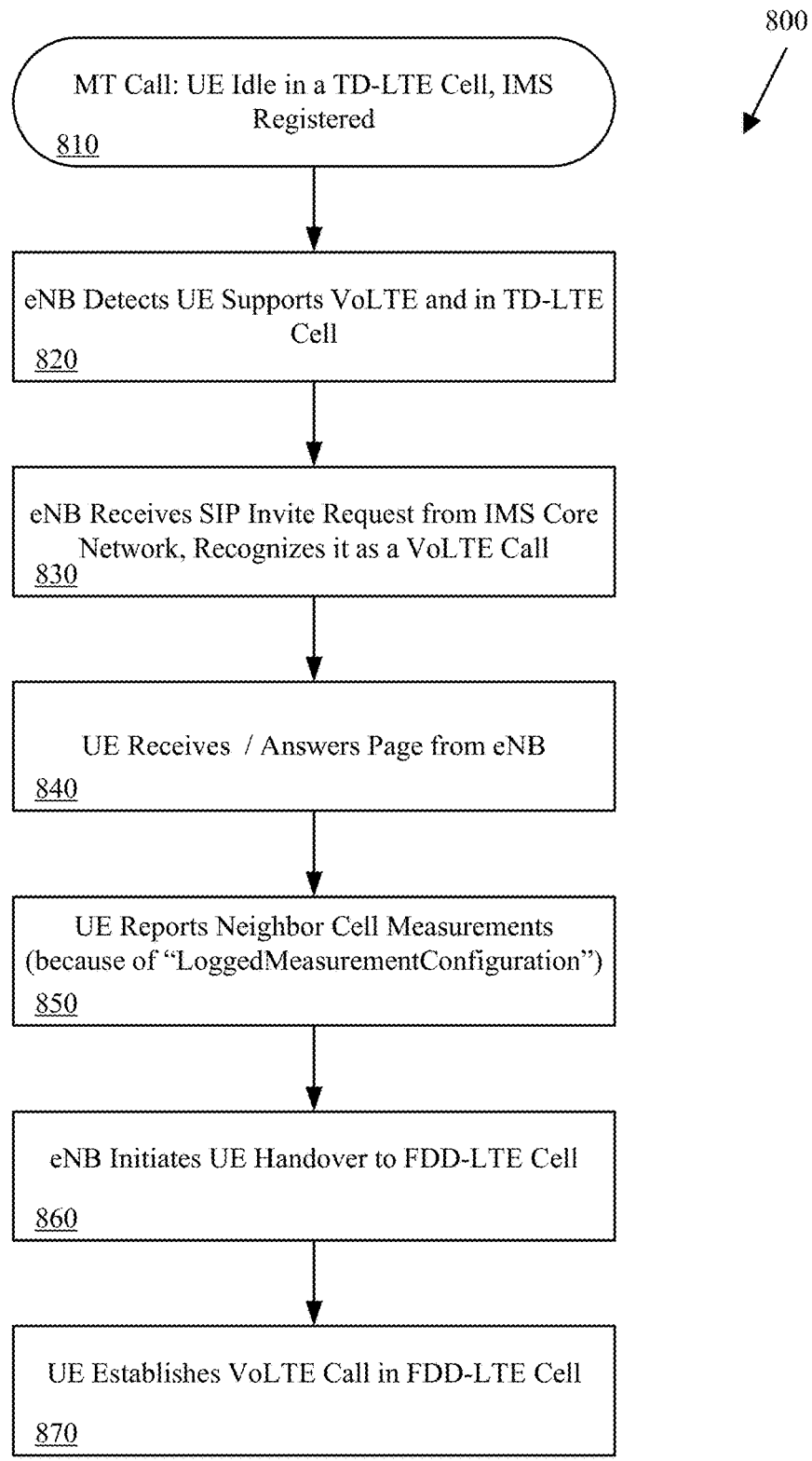
FIG. 8 illustrates an exemplary UE solution flowchart for UE-idle, mobile terminated (MT) calls according to certain embodiments.

FIG. 8 illustrates an exemplary UE solution flowchart 800 for UE-idle, mobile terminated (MT) calls according to certain embodiments. As shown in FIG. 8, at 810, the UE is idle in a TD-LTE cell and is IMS registered. At 820, the eNB detects that the UE supports VoLTE and is in the TD-LTE cell. At 830, the eNB receives an incoming session initiation protocol (SIP) invite request from the IMS core network and recognizes it as a VoLTE call for the idle UE. Since the UE is in RRC idle mode, the UE will be configured such that the FDD-LTE cells have a higher priority than the TD-LTE cells in cell-reselection. At 840, the UE will receive and answer the page from the eNB in the cell it is camped on. If camped on an FDD-cell, the UE will proceed to the VoLTE call directly. If camped on a TD-LTE cell and since if the eNB is able to recognize the page as a VoLTE call (from 840), then the UE would have been configured in idle mode using "LoggedMeasurementConfiguration." Then at 850, the UE will report the neighbor cells measurements. At 860, the eNB will trigger a handover (HO) command to the UE to an FDD-LTE cell. Finally, at 870, the UE can establish the VoLTE call in the FDD-LTE cell.

In certain embodiments, if a call ends during a VoLTE call, the UE can ensure that the VoLTE call resumes in an FDD-LTE cell. In the case of mobility, the UE can filter its reports to the eNB, and never report TD-LTE cell measurements. If it is a newly discovered cell, the UE can use its second CC radio to read the SIB information to determine whether the new cell is FDD-LTE or TD-LTE. In certain embodiments, if radio link failure (RLF) is triggered while in a VoLTE call, the UE should not scan TDD bands until after either the timer T311 has expired or the upper layers have declared VoLTE call drop. Note that the timer T311 generally starts while initiating RRC CONNECTION RE-ESTABLISHMENT procedure and stops upon selection of a suitable E-UTRA cell OR a cell using another radio access technology (RAT).

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements added.

What is claimed is:

1. A method for making a mobile originated (MO) call by a mobile device in a time-division Long-Term Evolution (TD-LTE) wireless communication cell, the mobile device being voice over LTE (VoLTE) capable and carrier aggregation (CA) capable, with a plurality of component carrier (CC) chains, comprising:
   performing an inter radio access technology (iRAT) measurement for a frequency division duplexed LTE (FDD-LTE) cell using fewer than all CC chains of the plurality of CC chains;
   receiving an indication for making the MO call; and
   in response to determining that the FDD-LTE cell is available as indicated from the iRAT measurement:
      triggering a handover by bias to iRAT measurement reports for the FDD-LTE cell, wherein adding the bias is further in response to determining that the mobile device is in a TD-LTE connected mode;
      attaching to the FDD-LTE cell to make the MO call; and
      using VoLTE for making the MO call on the FDD-LTE cell.

2. The method of claim 1, wherein:
   the plurality of CC chains includes only three CC chains; and
   the fewer than all CC chains is only one CC chain.

3. The method of claim 1, wherein performing the iRAT measurement is performed with a periodicity.

4. The method of claim 3, wherein the periodicity follows an inter-frequency measurement periodicity for the mobile device.

5. The method of claim 4, wherein the inter-frequency measurement periodicity includes a gap measurement of 6 milliseconds (ms) every 40 ms.

6. The method of claim 1, further comprising, prior to performing the iRAT measurement:
   providing indications to the TD-LTE cell that the mobile device is voice over LTE (VoLTE) capable; and
   receiving a radio resource control (RRC) measurement object pertaining to the TD-LTE cell.

7. The method of claim 6, wherein the RRC measurement object includes FDD-LTE cell frequencies the mobile device can use for VoLTE.

8. The method of claim 1, wherein if the FDD-LTE cell is not available as indicated from the iRAT measurement, using circuit-switched fallback (CSFB) for making the MO call.

9. A mobile device for making a mobile originated (MO) call while in a time-division Long-Term Evolution (TD-LTE) wireless communication cell, the mobile device being voice over LTE (VoLTE) capable and carrier aggregation (CA) capable, comprising:
   at least two component carrier (CC) chains; and
   a processor configured for:
      performing an inter radio access technology (iRAT) measurement for a frequency division duplexed LTE (FDD-LTE) cell using one CC chain of the at least two CC chains;
      receiving an indication for making the MO call; and
      in response to determining that the FDD-LTE cell is available as indicated from the iRAT measurement:
         triggering a handover by bias to iRAT measurement reports for the FDD-LTE cell, wherein adding the bias is further in response to determining that the mobile device is in a TD-LTE connected mode;
         attaching to the FDD-LTE cell to make the MO call; and
         using VoLTE for making the MO call on the FDD-LTE cell.

10. The mobile device of claim 9, wherein performing the iRAT measurement is performed with a periodicity that includes a gap measurement of 6 milliseconds (ms) every 40 ms.

11. The mobile device of claim 9, the processor further configured for, prior to performing the iRAT measurement:
    providing indications to the TD-LTE cell that the mobile device is voice over LTE (VoLTE) capable; and
    receiving a radio resource control (RRC) measurement object pertaining to the TD-LTE cell.

12. The mobile device of claim 11, wherein the RRC measurement object includes FDD-LTE cell frequencies the mobile device can use for VoLTE.

13. The mobile device of claim 9, the processor further configured for, in response to determining that the FDD-LTE cell is not available as indicated from the iRAT measurement, using circuit-switched fallback (CSFB) for making the MO call.

14. A non-transitory computer-readable medium storing software instructions for making a mobile originated (MO) call by a mobile device in a time-division Long-Term Evolution (TD-LTE) wireless communication cell, the mobile device being voice over LTE (VoLTE) capable and carrier aggregation (CA) capable, with a plurality of component carrier (CC) chains, the software instructions being executable by one or more processors of the mobile device to cause the mobile device to:
    perform an inter radio access technology (iRAT) measurement for a frequency division duplexed LTE (FDD-LTE) cell using fewer than all CC chains of the plurality of CC chains;
    receive an indication for making the MO call; and
    in response to determining that the FDD-LTE cell is available as indicated from the iRAT measurement:
       triggering a handover by bias to iRAT measurement reports for the FDD-LTE cell, wherein adding the bias is further in response to determining that the mobile device is in a TD-LTE connected mode;
       attach to the FDD-LTE cell to make the MO call; and
       use VoLTE for making the MO call on the FDD-LTE cell.

15. The non-transitory computer-readable medium of claim 14, wherein, in performing the iRAT measurement, the software instructions are further executable to cause the mobile device to perform the iRAT measurement with a periodicity that includes a gap measurement of 6 milliseconds (ms) every 40 ms.

16. The non-transitory computer-readable medium of claim 14, wherein the software instructions are further executable to cause the mobile device to, prior to performing the iRAT measurement:
   provide indications to the TD-LTE cell that the mobile device is voice over LTE (VoLTE) capable; and
   receive a radio resource control (RRC) measurement object pertaining to the TD-LTE cell.

17. The non-transitory computer-readable medium of claim 14, wherein the software instructions are further executable to cause the mobile device to: in response to determining that the FDD-LTE cell is not available as indicated from the iRAT measurement, use circuit-switched fallback (CSFB) for making the MO call.

* * * * *